Terephthalic acid contet, % by weight.

3,736,294
POLY(ETHYLENE TEREPHTHALATE) FROM BIS (HYDROXYETHYL)TEREPHTHALATE AND TEREPHTHALIC ACID
Hidehiko Kobayashi, Kiichiro Sasaguri, Hiroshi Komoto, Sukeo Kawashima, and Mitsuo Kohno, Tokyo, Japan, assignors to Asahi Kasei Kogyo Kabushiki Kaisha, Osaka City, Osaka Prefecture, Japan
Continuation-in-part of application Ser. No. 48,878, June 15, 1970, which is a continuation of application Ser. No. 698,412, Jan. 17, 1968. This application Sept. 13, 1971, Ser. No. 179,979
Claims priority, application Japan, Jan. 24, 1967, 42/4,484
Int. Cl. C08g 17/01
U.S. Cl. 260—75 M                              7 Claims

ABSTRACT OF THE DISCLOSURE

Novel process for the preparation of fibre-forming polyethylene terephthalate containing no metal compound catalyst from bis($\beta$-hydroxyethyl) terephthalate and terephthalic acid, wherein a specific ratio-mixture of the starting materials is subjected to a pre-treatment at 260–300° C. under a pressure defined by the formula $$1 \leq p \leq \frac{1}{1.96} \times 10^{-3}(t-100)^2$$

Figure 1:
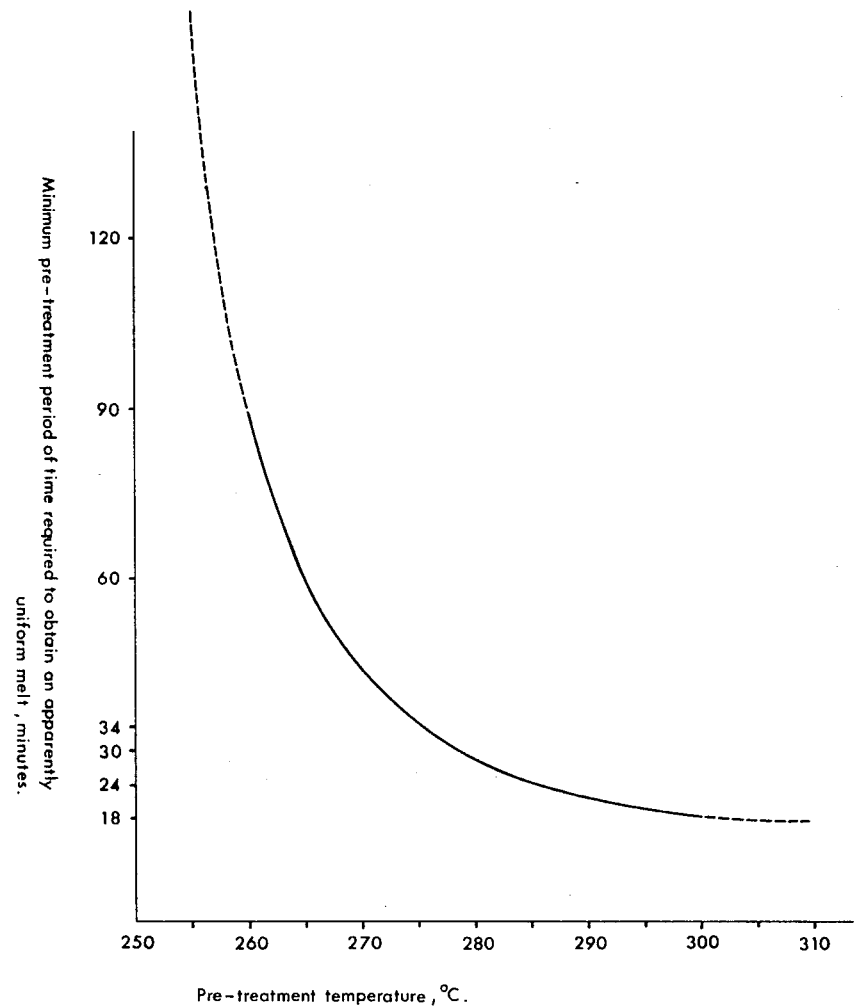

wherein $p$ represents the pressure of the reaction system (atm.) and $t$ represents the temperature of the reaction system until an apparently uniform melt is formed and subsequently the pre-treated mixture is subject to a polycondensation, said pre-treatment and said polycondensation being carried out in the absence of any metal compound catalyst. The present process can produce fibre-forming polyethylene terephthalate which is as white as magnesium oxide and excellent in spinnability and dyeing properties in a reasonable polymerization reaction period, leading to great advantage from the industrial point of view.

CROSS REFERENCE TO PRIOR APPLICATION

This is a continuation-in-part of our copending application Ser. No. 48,878, filed on June 15, 1970, now abandoned, which in turn is a streamlined continuation of application Ser. No. 698,412, filed on Jan. 17, 1968, now abandoned.

This invention relates to a process for the preparation of polyethylene terephthalate, and more particularly to a process for the preparation of a fibre-forming polyethylene terephthalate containing no metal compound catalyst.

Conventionally, various processes for preparing polyethylene terephthalate have been proposed. With the conventional processes, however, it is necessary to employ a catalyst such as a metal compound, for example a compound of lead, manganese, titanium, iron, zinc, cobalt, antimony, cadmium, germanium, copper, chromium, lithium, sodium, magnesium or calcium, in order to produce a fibre-forming polyethylene terephthalate of high molecular weight at an economical rate of polymerization reaction.

However, such catalytic polymerization possesses several serious disadvantages which are due to the presence of a metal compound employed. Stated illustratively, when a metal compound catalyst is employed in any stage of the process for preparing polyethylene terephthalate, it will result in deterioration of whiteness of the polymer, and also tends to promote thermal and/or oxidative degradation of the polymer to cause random cleavage of ester linkage in the polyester molecular chains when the polymer is melted for spinning or molding. Therefore, it is generally required to add a suitable stabilizing agent, such as a compound of phosphorus, in order to block such metal compound. Furthermore, the retention of the metal compounds in the molded articles such as a film and a fibre tends to cause such articles to develop coloration due to the metallic ions. Particularly, when such polymer having a metal compound incorporated therein is dyed, the color saturation or chroma of the dyed product tends to be disadvantageously reduced. This is a serious disadvantage in the textile field.

It is accordingly a primary object of the present invention to provide a process for the preparation of a fibre-forming polyethylene terephthalate containing no metal compound catalyst.

It is another object of the present invention to provide a process as described, which is industrially acceptable.

Figure 2:
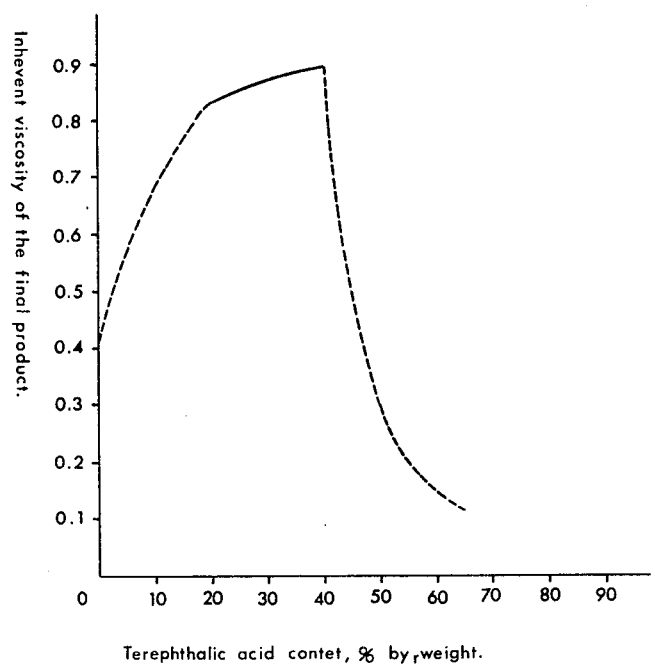

The foregoing and other objects of the present invention will be apparent from the following detailed description taken in connection with the accompanying drawings in which:

FIG. 1 is a diagram showing the relationship between the pre-treatment temperature and the minimum period of time required for the pre-treatment; and FIG. 2 is a diagram showing the relationship between the terephthalic acid content and the inherent viscosity of the desired product obtained.

According to the present invention, there is provided a process for the preparation of polyethylene terephthalate comprising admixing bis ($\beta$-hydroxyethyl) terephthalate with terephthalic acid, the terephthalic acid content being 20–40 mole percent, subjecting the resulting mixture to a pre-treatment at a temperature of 260–300° C., and under a pressure defined by the formula $$1 \leq p \leq \frac{1}{1.96} \times 10^{-3}(t-100)^2$$

wherein $p$ represents the pressure of the reaction system (atm.) and $t$ represents the temperature of the reaction system (° C.), until an apparently uniform melt is formed and subsequently subjecting the pre-treated mixture to a polycondensation reaction at an elevated temperature and under a reduced pressure, said pre-treatment and said polycondensation being carried out in the absence of any metal compound catalyst.

On the other hand, in the prior arts, for example, in the specifications of British Pat. No. 775,030 and U.S. Pat. 3,070,575, it has been disclosed to prepare polyethylene terephthalate from bis-($\beta$-hydroxyethyl) terephthalate and terephthalic acid. In the process of the British patent specification No. 775,030 wherein an equi-molar mixture of bis($\beta$-hydroxyethyl) terephthalate and terephthalic acid is subjected to a polycondensation at an elevated temperature under a reduced pressure to produce a desired polyethylene terephthalate, the polymerization reaction is conducted for a period as long as 5 hours, but the inherent viscosity of the produced polymer is insufficiently 0.55. In the process of the U.S. patent specification No. 3,070,-575 wherein bis($\beta$-hydroxyethyl) terephthalate is admixed with terephthalic acid in a molar ratio of 1.0:0.9–0.1 and the resulting mixture is subjected to a polycondensation in the presence of at least about 0.01 mole percent, based on the bis($\beta$-hydroxyethyl) terephthalate, of a basic salt having an atomic number less than 26 to produce a desired polyethylene terephthalate having a low ether content, the produced polymer contains the metal compound, and the dyed fibre spun from the polymer is inferior in color saturation or chroma. Furthermore, when the polymerization in the process of the U.S. Pat. No. 3,070,575 is conducted in the absence of any metal compound, the viscosity of the produced polymer is low as shown in Table 4 (which will be shown later), and will scarcely increase but rather cause unfavorable coloration even upon a long period of polymerization.

By contrast to such prior arts, according to the present invention, there can successfully be obtained a polyethylene terephthalate of a fibre-forming viscosity which is excellent in whiteness, transparency, spinnability and thermal elongation. The dyed fibre formed from the polymer produced according to this invention has an excellent chroma.

In the present invention, the terephthalic acid content of a mixture of bis($\beta$-hydroxyethyl)terephthalate and terephthalic acid is critical, and in the range of 20–40 mole percent. When the terephthalic acid content outside of the range of 20–40 mole percent, high or low, is employed, the polymer having a sufficient viscosity to form a fibre or film can not be obtained even if the pre-treatment of this invention is effected, under a specific pressure as mentioned before, for a sufficiently long period of time, as clearly understood from Table 5 (as will be shown later) and FIG. 2.

The pressure of the pre-treatment is also important. It is necessary to conduct the pre-treatment under a pressure defined by the formula $$1 \leq p \leq \frac{1}{1.96} \times 10^{-3}(t-100)^2$$

wherein $p$ and $t$ are as defined before. Even if the terephthalic acid content and the relationship between the temperature and the time for pre-treatment (which will be mentioned later) meet the requisites of this invention, the pre-treatment reaction will not smoothly proceed under a pressure outside of the range as defined above, and the subsequent polymerization results in a polymer having a low viscosity and a poor whiteness.

Furthermore, according to this invention, it is also important to conduct a pre-treatment until an apparently uniform melt is formed. The period of time required for forming an apparently uniform melt is varied depending on the temperature employed. In this invention, the temperature for the pre-treatment is critical and in the range of 260–300° C. Then, there is a specific relationship between the temperature and the pre-treatment time needed, namely, at least 90 minutes for 260° C., at least 43 minutes for 270° C., at least 28 minutes for 280° C., at least 21 minutes for 290° C., and at least 18 minutes for 300° C. (See Table 2 which will be shown later.) When the relationship is diagrammatically shown as in FIG. 1, there is obtained a continuous curve for defining the minimum pre-treatment period required in relation to the temperature. Thus, the apparently uniform melt is formed by effecting a pre-treatment at a temperature of 260–300° C. for at least the minimum pre-treatment period as defined in FIG. 1.

The thus sufficiently pre-treated mixture is subsequently subjected to a polycondensation reaction at an elevated temperature of 230–300° C., preferably 280–290° C. and under a reduced pressure of below 1 mm. Hg, preferably below 0.5 mm. Hg to produce a fibre-forming polyethylene terephthalate having an inherent viscosity of over 0.7 and excellent properties within a reasonable period of time. If the pre-treatment reaction period is insufficient, it is absolutely impossible to obtain the final polymers having an inherent viscosity of 0.7 as shown in Table 3 (which will be shown later).

In the above-mentioned apparently uniform melt formed by the pre-treatment, there are coexistent oligomer, free ethylene glycol and water. Under specific pressures in the range as defined by the afore-mentioned formula, the water, due to its vapor pressure, evaporates out of the reaction system. Since the ratio of terminal OH of the oligomer to terminal COOH is slightly larger than 1 due to the specific molar ratio of the starting bis($\beta$-hydroxyethyl) terephthalate to terephthalic acid, in the subsequent polymerization reaction at an elevated temperature and under a reduced pressure, polymerization by esterification with dehydration proceeds, the rate of such esterification type polymerization reaction being by far larger than that of the polymerization reaction with de-ethylene glycolization. Thus, according to the present process, the reaction time required for sufficient polymerization is much reduced as compared with that of the conventional non-catalytic polymerization, and uncolored fibre-forming polyethylene terephthalate having excellent properties is obtained.

As described, the gist of the process of the present invention resides in that bis($\beta$-hydroxyethyl)terephthalate and terephthalic acid are admixed, the terephthalic acid content being 20–40 mole percent, and heated for pre-treatment at 260–300° C. and under a specific pressure as defined before until an apparently uniform melt is formed, followed by polycondensation at an elevated temperature under a reduced pressure, the pre-treatment and the polycondensation being effected in the absence of any catalyst or metal compound, thereby to produce a fibre-forming polyethylene terephthalate containing no metal compound catalyst, which is as white as magnesium oxide and excellent in spinnability and dyeing properties in a reasonable polymerization reaction period, leading to great advantage from the industrial point of view. In the polymer obtained by the process of this invention, there may of course be incorporated an additive which is usually utilized in the textile field.

In order that the invention may be well understood, the following examples are given by way of illustration only.

In the examples:

(1) The inherent viscosity was measured at 35° C. in a mixture of tetrachloroethane with phenol (3:1 by weight).

(2) The whiteness was expressed in terms of any of five grades, 1, 2, 3, 4 and 5. Grade 5 means a whiteness equal to that of pure magnesium oxide. Each of grades 1 to 4 was defined by the corresponding standard sample having the degree of coloration developed by heating the polymer of grade 5 under a current of nitrogen. Thus grade 1 means slightly yellowish coloration and standard grades 2, 3 and 4 are defined as degrees of yellowing coloration developed by heating for varied periods, respectively.

(3) The chroma of the dyed fibre was determined as follows: The polymer fibres were dyed with 1,4-dioxyanthraquinone. There was employed as the standard dyed polyethylene terephthalate one obtained by polycondensation in the presence of a $Sb_2O_3$ catalyst (0.05%), the chroma of which fibre was defined as a lower standard ± (lowest degree). The highest chroma obtained by dyeing the fibres produced from the present polymer was defined as a higher standard +++++ or +5 (highest degree). Visual estimation of the degree of the chroma of each test dyed fibre was made by ten persons, through comparison with said lower and higher standards, and the average of the estimations was given.

EXAMPLE 1

66 parts by weight (0.40 mol.) of terephthalic acid were added to 152 parts by weight (0.60 mol.) of bis ($\beta$-hydroxyethyl) terephthalate. The resulting mixture was reacted, after replacement of atmosphere with nitrogen, at a temperature of 285° C. under a nitrogen pressure as indicated in Table 1 for 25 minutes with stirring. The thus reacted mixture was transparent and uniform. Then the pressure was reduced to 0.3 mm. Hg and the mixture was further reacted at 285° C. for two and one-third hours. In Table 1 are summarized the inherent viscosity, whiteness, and melting point of the thus obtained polymer. The polymer was melted at 290° C. and spun through a nozzle of 0.3 mm. in diameter and then stretched to 5 times its original length at 150° C. The fibre thus made was dyed with 1,4-dioxyanthraquinone at 110° C. The tensile strength and the elongation of the fibre and the chroma of the dyed fibre were also shown in Table 1.

TABLE 1

| Experiment number | Nitrogen pressure | Inherent viscosity of polymer | Whiteness, grade | Tensile strength of a fibre stretched to 5 times its original length | Elongation of a fibre stretched to 5 times its original length | Chroma of a dyed fibre |
|---|---|---|---|---|---|---|
| 1 | 1.0 kg./cm.² | 0.62 | 3 | Impossible to stretch a fibre to 5 times its original length. (The fibre is loosened and napped even when stretched to 4 times its original length due to unevenness of the fibre.) | | +++ (Good.) |
| 2 | 1 atm | 0.75 | 4 | 5.0 g./d | 18% | ++++ (Very good.) |
| 3 | 5 atm | 0.77 | 5 | 5.5 g./d | 19% | +++++ (Excellent.) |
| 4 | 9 atm | 0.80 | 5 | 5.4 g./d | 19% | +++++ (Excellent.) |
| 5 | 11 atm | 0.86 | 5 | 5.3 g./d | 19% | +++++ (Excellent.) |
| 6 | 13 atm | 0.85 | 5 | 5.5 g./d | 20% | +++++ (Excellent.) |
| 7 | 14 atm | 0.76 | 4 | 5.3 g./d | 18% | ++++ (Very good.) |
| 8 | 15 atm | 0.45 | 3 | Impossible to stretch a fibre to 5 times its original length. (The fibre is liable to be snapped when spun and loosened and napped even when stretched to 4 times its original length.) | | |

EXAMPLE 2

152 parts by weight (0.60 mol.) of bis (β-hydroxyethyl) terephthalate and 60 parts by weight (0.36 mol.) of terephthalic acid were charged into a polymerization reactor, wherein pre-treatment was carried out at a temperature in the range of 260° C. under a pressure of 12 a.t.m. A reaction period required to produce an apparent uniform melt was measured and shown in Table 2 and FIG. 1. The thus obtained apparently uniform melt was subjected to polycondensation reaction at a temperature of 285° C. under a pressure of 0.2 mm. Hg for 2.5 hours to produce a polyethylene terephthalate having an inherent viscosity of about 0.75.

TABLE 2

| Pretreatment temperature, ° C. | Pretreatment period required to form an apparently uniform melt, minutes | Inherent viscosity of polymer obtained by the subsequent polycondensation reaction for 2.5 hours | Whiteness, grade |
|---|---|---|---|
| 255 | 160 | 0.70 | ¹ 2 |
| 260 | 90 | 0.76 | 4 |
| 265 | 60 | 0.78 | 5 |
| 270 | 43 | 0.77 | 5 |
| 275 | 34 | 0.78 | 5 |
| 280 | 28 | 0.75 | 5 |
| 285 | 24 | 0.73 | 5 |
| 290 | 21 | 0.76 | 5 |
| 295 | 19 | 0.77 | 5 |
| 300 | 18 | 0.78 | 4 |
| 305 | 17.5 | 0.70 | ¹ 2 |
| 310 | 17.0 | 0.65 | ¹ 1 |

¹ Yellowish brown.

As apparent from the above Table 2, the polymers obtained according to the present invention had a good whiteness of grade 4–5, good spinning properties and a good thermal elongation. Moreover, dyeing of fibres produced from the polymers gave a chroma evaluated as +5.

By way of comparison, the same procedure of the pretreatment as described in Example 2 was carried out except that the pre-treatment periods were respectively shortened by 5 minutes than the pre-treatment periods of Example 2, namely, polycondensation reactions are effected under a condition where the mixture remained turbid, at a temperature of 285° C. under a pressure of 0.2 mm. Hg for 2.5 hours and 4 hours. The inherent viscosities of the thus obtained polymers were shown in Table 3. The inherent viscosity of each of the polymers was lower than that (namely, about 0.75) of the polymer obtained by carrying out the polycondensation after the mixture was apparently uniformly melted.

TABLE 3

| Pretreatment temperature ° C. | Pretreatment period, minutes | Inherent viscosity of a polymer obtained by the subsequent polycondensation for 2.5 hours | Inherent viscosity of a polymer obtained by the subsequent polycondensation for 4 hours |
|---|---|---|---|
| 260 | 85 | 0.51 | 0.60 |
| 270 | 38 | 0.49 | 0.51 |
| 280 | 23 | 0.46 | 0.47 |
| 290 | 16 | 0.45 | 0.46 |
| 200 | 13 | 0.42 | 0.42 |

The thus obtained polymer having a whiteness of grade 3–4 was not transparent and inferior in spinning properties causing snapping and also inferior in thermal elongation.

EXAMPLE 3

2.07 parts by weight (0.0125 mol.) of terephthalic acid were added to 12.7 parts by weight (0.05 mol.) of bis(β-hydroxyethyl) terephthalate. The mixture was then pre-treated at 283° C. under a pressure of 1 atm. for 25 minutes to obtain a uniform melt mixture. Then the mixture was subjected to polycondensation under a pressure of 0.5 mm. Hg at 283° C. for 2.5 hours and for 4 hours. The polymers thus obtained had inherent viscosities of 0.79 and 0.85 respectively, a good whiteness of grade 5 and a good spinnability. The dyed fibre was evaluated as having a chroma of +++++.

By way of comparison, the pre-treatment reaction described above was repeated with the exception that the reaction period was 20 minutes. The mixture thus obtained was cloudy white. Subsequently, the poly-condensation was carried out under the same condition as described above for 2.5 hours and for 4 hours. The polymers thus obtained had an inherent viscosity of only 0.23 and 0.25, and no polymer of high viscosity was obtained.

Further by way of comparison, the pre-treatment was effected under the same condition as described above except that the reaction was carried out in the presence of 0.011 part by weight (0.00005 mol.) of magnesium acetate for 20 minutes to obtain a uniform melt mixture. Then, the polycondensation was carried out under a pressure of 0.3 mm. Hg at 283° C. for 4 hours. The polymer thus obtained had an inherent viscosity of 0.63, a whitenes of grade 4 and an ordinary spinnability. The thermal elongation of the polymer was slightly inferior and the colour saturation or chroma of the dyed fibre was evaluated as only ±.

The results of the three experiments in respect of the reaction conditions, inherent viscosity of the resulting polymers, whiteness of the resulting polymers, spinnability of the polymers and chroma of the dyed fibres are shown in Table 4.

TABLE 4

| | Metal compound | Period of pretreatment, minutes | Inherent viscosity of the polymer after 2.5-hour polycondensation | Inherent viscosity of the polymer after 4-hour polycondensation | Whiteness grade | Spinnability | Chroma of the dyed fibres |
|---|---|---|---|---|---|---|---|
| This invention | | 25 | 0.79 | 0.85 | 5 | Good | +++++ (Excellent.) |
| Comparative experiment | | 20 | 0.23 | 0.25 | | | |
| Comparative experiment (U.S. Pat. 3,070,575 Example X). | Mg(OOCCH₃)₂, 0.00005 mole. | 20 | | 0.63 | 4 | Ordinary | ± (Poor.) |

EXAMPLE 4

Bis(β-hydroxyethyl) terephthalate and terephthalic acid were mixed in the ratio shown in Table 5 and reacted under a pressure of 12 atm. at 285° C., while stirring for 30 minutes to obtain a uniform mixture. Then the polycondensation was carried out under a pressure of 0.1 mm. Hg at 285° C. for 3 hours. The inherent viscosity and whiteness of the polymer thus obtained are shown in Table 5 and FIG. 2. The molecular weight of the polymer greatly depends on mole percent of terephthalic acid in the starting mixture of bis (β-hydroxyethyl) terephthalate and terephthalic acid. When the terephthalic acid is present in an amount of 20–40 mole percent, the polymer having a favourable viscosity of over 0.8 can be obtained. The thus obtained polymer had a whiteness of grade 5 as good as a magnesium oxide and an excellent chroma of the dyed fibre.

TABLE 5

| Terephthalic acid content in the system at the beginning of the pre-treatment reaction, mole percent | Inherent viscosity of the final polymer | Whiteness of the final polymer | Chroma of the dyed fibre |
|---|---|---|---|
| 0 | 0.409 | 1 | ++ (Fairly good.) |
| 3 | 0.503 | 2 | |
| 6 | 0.583 | 3 | |
| 10 | 0.687 | 4 | +++ |
| 20 | 0.840 | 5 | +++++ (Excellent.) |
| 30 | 0.859 | 5 | +++++ (Excellent.) |
| 40 | 0.903 | 5 | +++++ (Excellent.) |
| 45 | 0.543 | 4 | ++ (Fairly good.) |
| 47 | 0.400 | 2 | |
| 50 | 0.332 | | + (Poor.) |
| 55 | 0.224 | | |
| 60 | 0.153 | | |
| 65 | 0.132 | | |

What is claimed is:

1. A process for the preparation of fibre-forming polyethylene terephthalate comprising admixing bis(β-hydroxyethyl) terephthalate with terephthalic acid, the terephthalic acid content being 20 to 40 mole percent, subjecting the resulting mixture to a pre-treatment at a temperature of 260–300° C. and under a pressure defined by the formula $$1 \leq p \leq \frac{1}{1.96} \times 10^{-3}(t-100)^2$$

wherein $p$ represents the pressure of the reaction system (atm.) and $t$ represents the temperature of the reaction system (° C.) until an apparently uniform melt is formed and subsequently subjecting the pre-treated mixture to a polycondensation reaction at a temperature of 230–300° C. and under a reduced pressure of below 1 mm. Hg, said pre-treatment and said polycondensation being carried out in the absence of any metal compound catalyst.

2. A process as claimed in claim 1, wherein a temperature-minimum time relationship in said pre-treatment corresponds to the curve as appearing in FIG. 1.

3. A process as claimed in claim 1, wherein said pre-treatment is conducted for at least 90 minutes, at 260° C.

4. A process as claimed in claim 1, wherein said pre-treatment is conducted for at least 43 minutes at 270° C.

5. A process as claimed in claim 1, wherein said pre-treatment is conducted for at least 28 minutes at 280° C.

6. A process as claimed in claim 1, wherein said pre-treatment is conducted for at least 21 minutes at 290° C.

7. A process as claimed in claim 1, wherein said pre-treatment is conducted for at least 18 minutes as 300° C.

References Cited

UNITED STATES PATENTS

| 2,907,753 | 10/1959 | Maclean | 260—75 |
| 3,070,575 | 12/1962 | Cramer | 260—47 |
| 3,185,668 | 5/1965 | Meyer et al. | 260—75 |
| 3,185,669 | 5/1965 | McKinney | 260—75 |
| 3,185,670 | 5/1965 | McKinney | 260—75 |

FOREIGN PATENTS

| 775,030 | 5/1957 | Great Britain | 260—75 M |
| 931,241 | 7/1963 | Great Britain | 260—75 M |
| 1,001,429 | 8/1965 | Great Britain | 260—75 M |
| 1,017,553 | 1/1966 | Great Britain | 260—75 M |

OTHER REFERENCES

Kirk-Othmer, Encycl. Chem. Technol., vol. 16, 162–67 (1968).

MELVIN GOLDSTEIN, Primary Examiner